United States Patent
Naponelli

(10) Patent No.: US 9,339,013 B1
(45) Date of Patent: May 17, 2016

(54) URINE COLLECTION DEVICE

(71) Applicant: Karen Naponelli, Chicago, IL (US)

(72) Inventor: Karen Naponelli, Chicago, IL (US)

(*) Notice: Subject to any disclaimer, the term of this patent is extended or adjusted under 35 U.S.C. 154(b) by 0 days.

(21) Appl. No.: 14/795,808

(22) Filed: Jul. 9, 2015

(51) Int. Cl.
*A01K 29/00* (2006.01)
*A01K 23/00* (2006.01)

(52) U.S. Cl.
CPC .................................... *A01K 23/005* (2013.01)

(58) Field of Classification Search
CPC ............................ A01K 23/005; A61B 10/007
USPC .............. 294/1.3, 1.4, 1.5; 119/161; 600/574; 604/317
See application file for complete search history.

(56) References Cited

U.S. PATENT DOCUMENTS

| | | | | |
|---|---|---|---|---|
| 4,106,490 A * | 8/1978 | Spilman | ................. | A61F 5/4556 600/574 |
| 5,146,637 A * | 9/1992 | Bressler | ............... | A61B 10/007 141/372 |
| 6,299,606 B1 * | 10/2001 | Young | .................. | A61B 10/007 604/317 |
| 6,602,231 B1 * | 8/2003 | Mariea | .................. | A61B 10/007 604/317 |
| 6,908,441 B1 * | 6/2005 | Bernard | ............... | A61B 10/007 600/574 |
| 7,128,352 B1 * | 10/2006 | Phippen | ................ | A01K 23/005 119/161 |
| 7,214,199 B1 * | 5/2007 | Yastrebov | ............ | A01K 23/005 600/573 |
| 7,762,596 B1 * | 7/2010 | Gaydos | ................. | A01K 23/005 119/161 |
| 8,597,207 B1 * | 12/2013 | Perry | ...................... | A61F 5/455 600/574 |
| 2008/0116704 A1 * | 5/2008 | Botello | ................. | A01K 23/005 294/1.5 |
| 2009/0076413 A1 * | 3/2009 | Robles | .................. | A61B 10/007 600/573 |
| 2014/0276216 A1 * | 9/2014 | Lipinsky | ............... | A61B 10/007 600/573 |
| 2015/0190310 A1 * | 7/2015 | McBride | ................ | B65D 25/54 73/864.51 |

* cited by examiner

*Primary Examiner* — Dean Kramer
(74) *Attorney, Agent, or Firm* — Justin Lampel

(57) ABSTRACT

A device for collecting the urine of a pet or farm animal is provided. The device has a housing having a front, a back, a first side, a second side, a top, a bottom and a generally hollow interior. A concave reservoir is located within the interior of the housing at the bottom of the housing and has a generally circular opening for receiving a removable hollow vial which collects the urine of the pet or farm animal. The housing has a narrow front which is easily inserted between the hind legs of the pet or farm animal to collect the animal's urine. The urine flows into the housing, then into the concave reservoir and then into the removable vial (located outside the housing), which is capped once filled, and then transported to a veterinarian for analyzation.

6 Claims, 5 Drawing Sheets

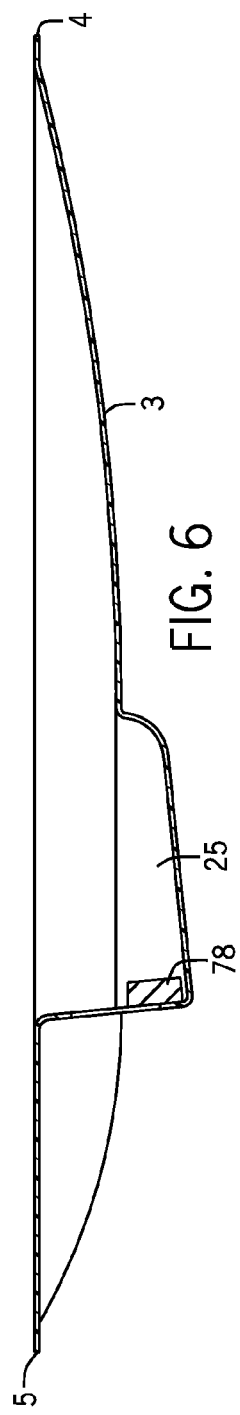
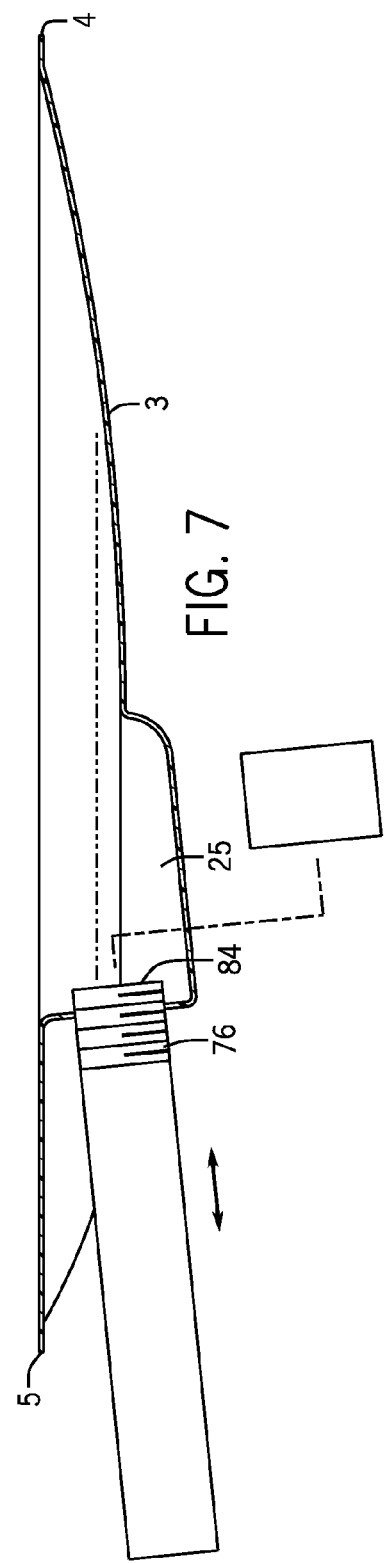

URINE COLLECTION DEVICE

BACKGROUND OF THE INVENTION

A device for collecting the urine of a pet or farm animal is provided. The device has a housing having a front, a back, a first side, a second side, a top, a bottom and a generally hollow interior. A concave reservoir is located within the interior of the housing at the bottom of the housing and has a generally circular opening for receiving a removable hollow vial which collects the urine of the pet or farm animal. The housing has a narrow front which is easily inserted between the hind legs of the pet or farm animal to collect the animal's urine. The urine flows into the housing, then into the concave reservoir and then into the removable vial (located outside the housing), which is capped once filled, and then transported to a veterinarian for analyzation. A removable handle allows a user to discard the used and no longer sterile housing and allows the user to reuse the handle portion.

Over the years, numerous devices and methods have been developed to collect the urine of an animal. For example, U.S. Pat. No. 7,762,596 to Gaydos et al. discloses a device and method for collecting animal urine having a tray mounted to an elongated handle which is at least partially hollow. The handle, at one end, is interconnected to a tray to be deployed beneath the animal in advance of urination. At its other end, the handle is configured as a hand grip. Located at a point along the handle and spaced away from the tray, is a collection bottle mount to which is connected a specimen collection bottle within direct flow connection with the tray via the partially hollow handle. The bottle and mount serve as a second handle for steadying control of the device. By tipping the handle such that the tray is raised above the handle, urine collected in the tray is drained directly to the bottle. The bottle includes a slit wafer ensuring against spillage when the bottle is removed for recapping and transport for analysis.

Further, U.S. Pat. No. 7,214,199 to Yastrebov discloses a system for collecting urine specimens from pet or animal comprising an elongated tray section having at one end a collection chamber for collecting a predetermined volume of urine in fluid communication with an open section of said tray to receive a stream of urine from the pet or animal, a discharge port at the opposite end of said tray and a specimen vial removably mounted to the discharge end of said tray whereby when an animal is urinating, the device is positioned under the stream with the collection chamber end downwardly inclined so that a sufficient quantity flows into the collection chamber to predetermined level and then tilting the device in a reverse direction so the collected sample flows into the specimen vial and is sealed.

Still further, U.S. Pat. No. 7,128,352 to Phippen discloses a device, method and kit for collection of a urine specimen from an animal having a cup to receive and hold the urine specimen, a lid to close cup after collection of the specimen, and a holder with a generally upright center extension member, a handle connected at the upper end of the extension member, and a cup holder extending forwardly from the lower end of the extension member and having an opening slidably receiving the cup for manual positioning of the cup under the animal from which the urine specimen is to be collected.

However, these patents fail to disclose a device for collecting urine of a pet which is easy to use and efficient. A need, therefore, exists for an improved device for collecting the urine of a pet.

SUMMARY OF THE INVENTION

A device for collecting the urine of a pet or farm animal is provided. The device has a housing having a front, a back, a first side, a second side, a top, a bottom and a generally hollow interior. A concave reservoir is located within the interior of the housing at the bottom of the housing and has a generally circular opening for receiving a removable hollow vial which collects the urine of the pet or farm animal. The housing has a narrow front which is easily inserted between the hind legs of the pet or farm animal to collect the animal's urine. The urine flows into the housing, then into the concave reservoir and then into the removable vial (located outside the housing), which is capped once filled, and then transported to a veterinarian for analyzation. A removable handle allows a user to discard the used and no longer sterile housing and allows the user to reuse the handle portion.

An advantage of the present device for collecting the urine of a pet is that the present device may have a disposable housing portion and a reusable handle portion.

And another advantage of the present device for collecting the urine of a pet is that the present device may direct the urine of the pet into a removable vial.

Still another advantage of the present device for collecting the urine of a pet is that the present device may have overflow holes which prevent urine from contacting the handle portion of the device.

Yet another advantage of the present device for collecting the urine of a pet is that the present device may have a splash guard which directs urine into the main housing portion.

And another advantage of the present device for collecting urine is that, in an embodiment, the handle portion may be removable from the main body section so as to allow a user the reuse the handle portion while discarding the main body section.

Still another advantage of the present device for collecting urine is that present device may have a first and a second foldable splash guard allows a user to fold the splash guard upward for male dogs and cats.

For a more complete understanding of the above listed features and advantages of the present device for collecting the urine of a pet reference should be made to the following detailed description of the preferred embodiments and to the accompanying drawings.

BRIEF DESCRIPTION OF THE DRAWING

FIG. 6 illustrates a side view of the main body housing with the removable vial unattached.

FIG. 7 illustrates a side view of the main body housing wherein the removable vial is attached to the main body housing.

DETAILED DESCRIPTION OF THE PREFERRED EMBODIMENTS

A device for collecting the urine of a pet or farm animal is provided. The device has a housing having a front, a back, a first side, a second side, a top, a bottom and a generally hollow interior. A concave reservoir is located within the interior of the housing at the bottom of the housing and has a generally circular opening for receiving a removable hollow vial which collects the urine of the pet or farm animal. The housing has a narrow front which is easily inserted between the hind legs of the pet or farm animal to collect the animal's urine. The urine flows into the housing, then into the concave reservoir and then into the removable vial (located outside the housing), which is capped once filled, and then transported to a veterinarian for analyzation. A removable handle allows a user to discard the used and no longer sterile housing and allows the user to reuse the handle portion.

Figure 1:
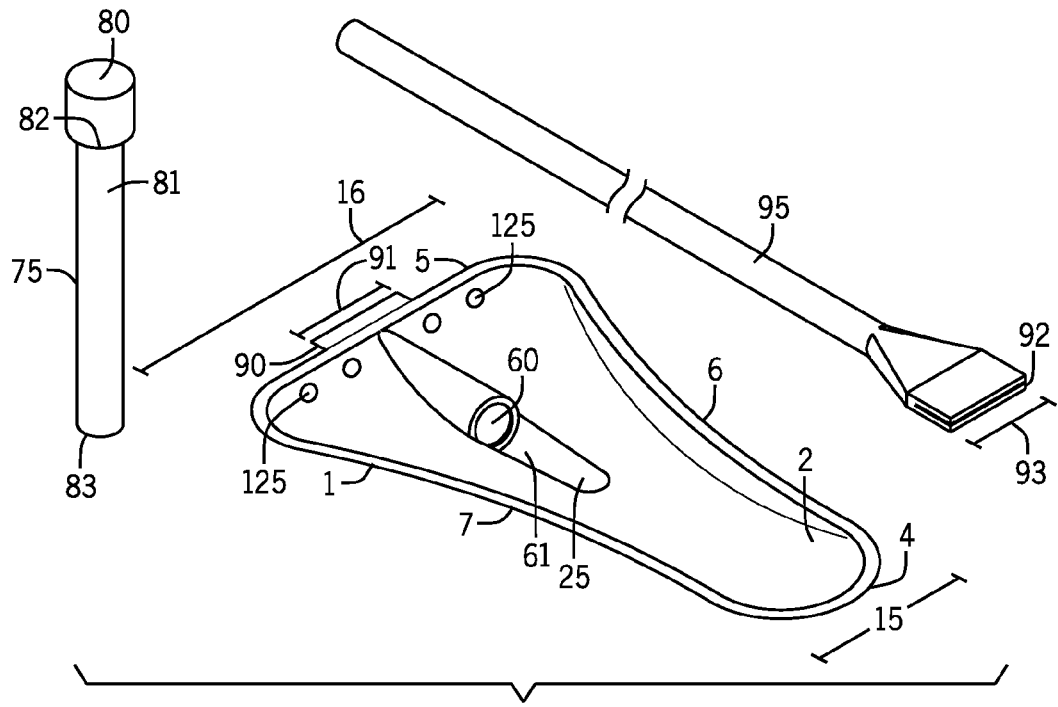
FIG. 1 illustrates a front perspective view of the main body housing, the removable vial and the handle portion.
Figure 2:
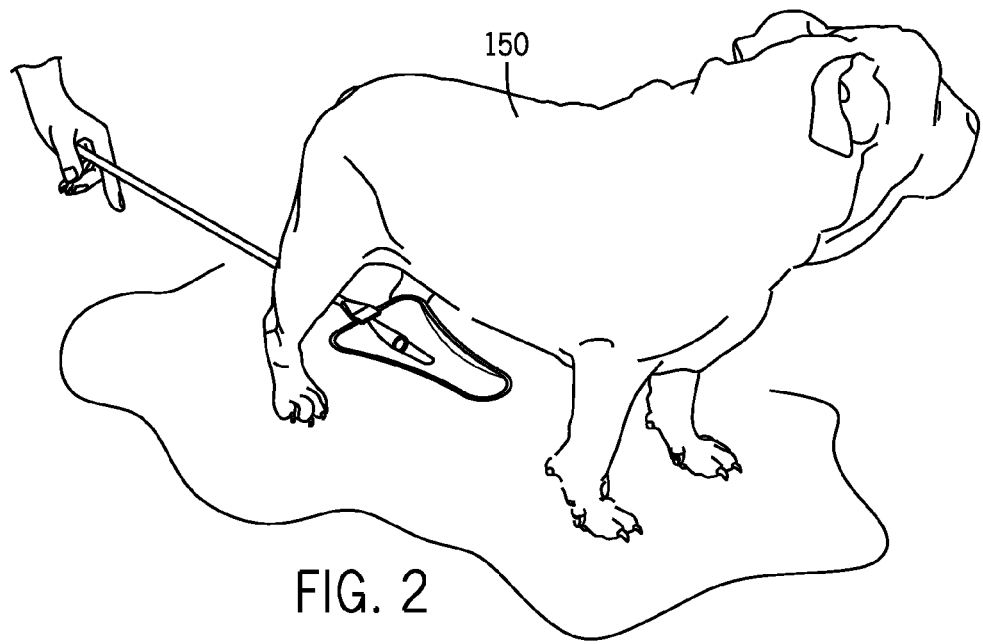
FIG. 2 illustrates a front perspective view of the device in the process of being used by a pet.
Figure 3:
FIG. 3 illustrates a side view of the main body housing.
Figure 4:
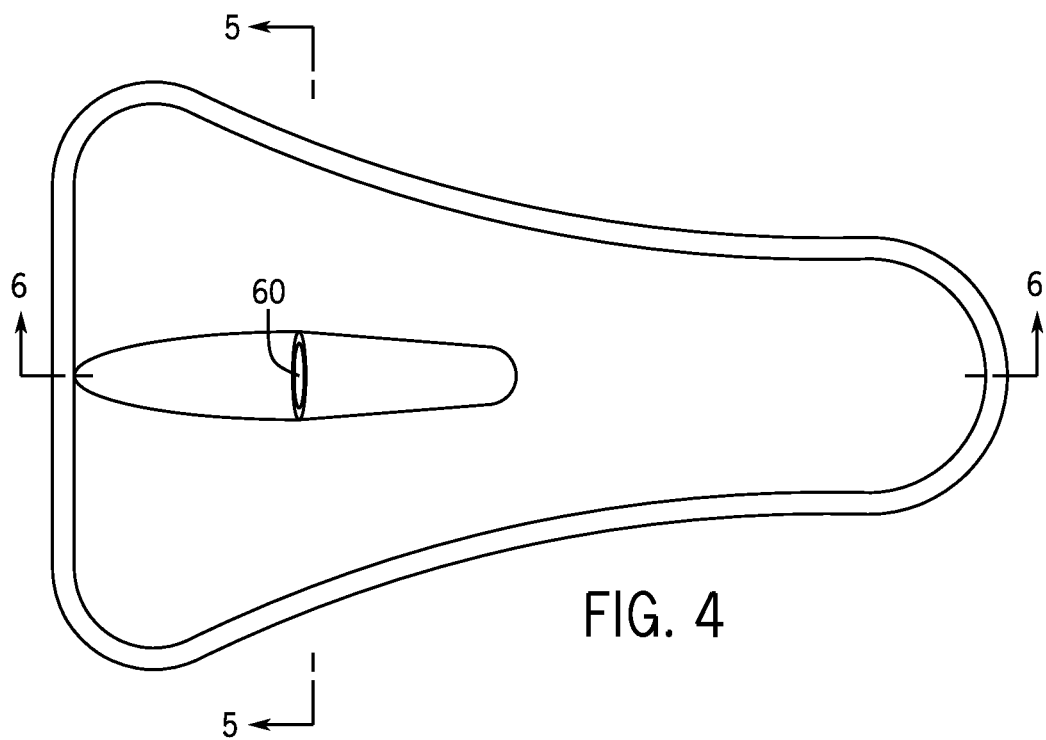
FIG. 4 illustrates a top view of the main body housing.
Figure 5:
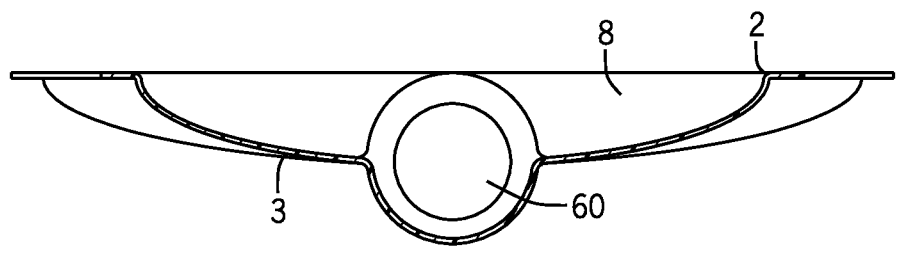
FIG. 5 illustrates a view of the back of the main body housing when the removable vial is unattached to the main body housing.

Referring first to FIGS. 1 and 2, in an embodiment, a device for collecting the urine of a pet 150 is provided. The device may have a main body housing 1, a removable vial 75 and a removable handle portion 95. The main body housing 1 of the device has a top 2, a concave bottom 3 (FIG. 5), a front 4, a back 5, a first side 6, a second side 7 and a generally hollow interior 8 (FIG. 5). Although the device 1 may be made of any suitable material, the device 1 is preferably made of plastic. Further, in an embodiment, the device 1 is kept in a sterile enclosure (not shown) prior to use and is either partially discarded (as described below) after use or is sterilized for subsequent uses.

In an embodiment, the front 4 of the main body housing 1 may have a length 15 and the back 5 of the main body housing 5 may have a length 16. Preferably, the front 4 of the main body housing 1 is approximately half the size as the length 16 of the back 5 of the main body housing 1. In particular, length 15 of the front 4 of the main body housing 1 is less than the length 16 of the back 5 of the main body housing 1 so that the front 4 of the main body housing 1 may easily fit between the hind legs of the pet 150.

Figure 8:
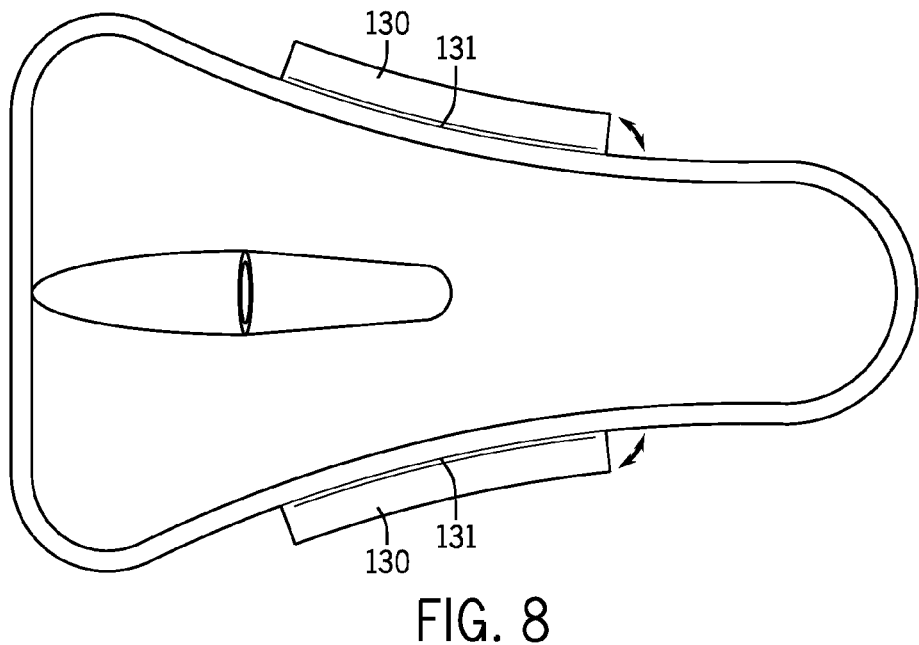
FIG. 8 illustrates an alternative embodiment wherein the main body housing has a rotating splash guard for male animals.
Figure 9:
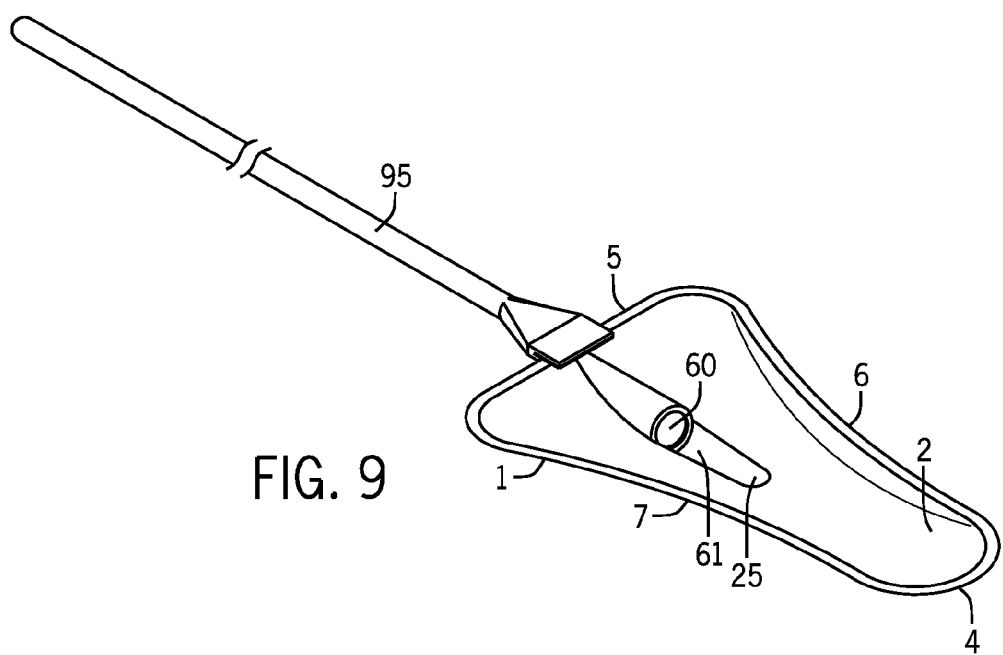
FIG. 9 illustrates the handle portion inserted onto the main body housing.
Figure 10:
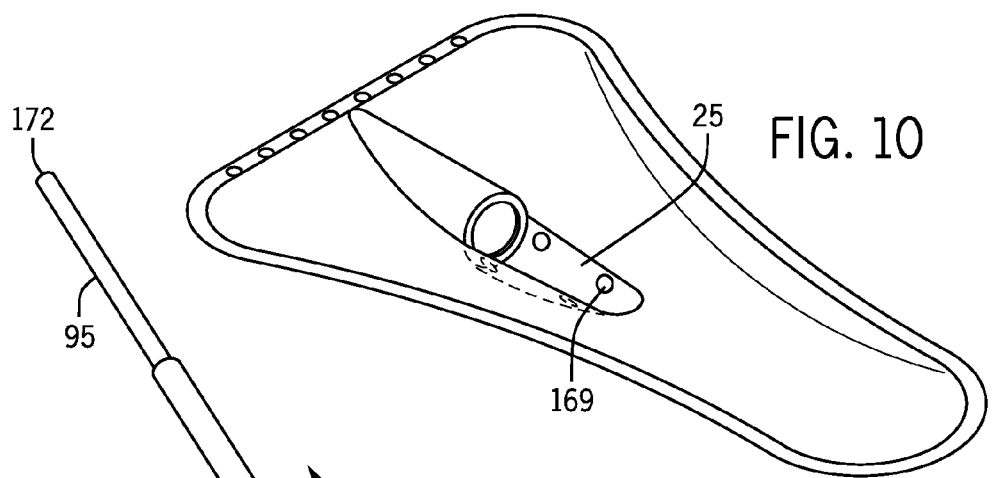
FIG. 10 illustrates an alternative embodiment wherein the concave reservoir has overflow openings.

In an embodiment, the top 2 portion of the main body housing 1 may be open, similar to a thin bowl. In an embodiment, the concave bottom 3 of the main body housing 1 may itself have a concave reservoir portion 25. The concave reservoir portion 25 (the lowest portion of the device) may act as a funnel directing the flow of urine down toward a generally circular opening 60 at a bottom 61 of the concave reservoir portion 25. Referring to FIG. 10, in an alternative embodiment to the concave reservoir portion 25 lacking a drainage opening (FIG. 1), the concave reservoir portion 25 may have at least one opening 169 which may act as a drainage for the overflow of urine from the pet. In an embodiment, the concave reservoir portion 25 is oval (FIG. 8).

In an embodiment, the removable vial 75 may be used in connection with the device. In particular, a removable vial 75 may have a removable cap 80 which, when removed, exposes an interior 81 of the removable vial 75. Preferably, the removable vial 75 may hold at least one hundred milliliters of liquid.

In an embodiment, the removable vial 75 may be temporarily secured to the generally circular opening 60 of the bottom of the reservoir portion 25. In particular, the removable vial 75 may have a first end 82, a second end 83 and an opening 84 (FIG. 7). The first end 82 of the removable vial 75 may have a threaded member 76 (FIG. 7) which may correspondingly and temporarily be secured a threaded member 78 (FIG. 6) of the generally circular opening 60.

As stated above, in an embodiment, the back 5 of the main body housing 1 may be secured to a removable handle portion 95. In particular, the back 5 of the main body housing 1 may have an elongated ridge 90 having a length 91. The elongated ridge 90 of the back 5 of the main body housing 1 may align with and may temporarily be secured (via friction) to a corresponding groove 92 of the handle portion 95 wherein the corresponding groove 92 has a length has a length 93 which is substantially similar to the length 91 of the elongated ridge 90. In particular, in an embodiment, the handle portion 95 may be temporarily secured to the back 5 of the main body housing 1 by sliding the elongated ridge 90 of the back 5 of the device 1 through the corresponding groove 92 of the removable handle portion 95. As a result, a user may use the device to collect the urine of the pet 150 and may then slide the main body housing 1 off the handle portion 95 to discard the main body housing 1 so as to replace the main body housing 1 with a sterile new main body housing 1 while keeping the handle portion 95 for future uses.

In an embodiment, the device 1 may have a plurality of overflow openings 125. The plurality of overflow openings 125 may be located near, for example, the back 5 of the main body housing 1 so that when the main body housing 1 is slightly tilted backward (as discussed below) any urine located in the main body housing 1 which does not flow into the concave reservoir portion 25 and then into the removable vial 75 exits the main body housing 1 through the plurality of overflow openings 125 and is therein prevented from contacting the hands of the user. The plurality of overflow openings 125 are smaller than the generally circular opening 60 of the concave reservoir portion 25.

Referring now to FIG. 8, in an alternative embodiment, the main body housing 1 may have a movable splash guard portion 130 located at, for example, the first side 6 and the second side 7. The movable splash guard portion 130 may be connected to the main body housing 1 at a foldable crease 131. The foldable crease 131 may allow the user to bend the movable splash guard portion 130 upward at the first side 6 and/or the second side 7. In particular, the user may bend the movable splash guard 130 upward for use with, for example, male dogs and cats which often have the tendency to lift a hind leg and urinate on an angle with respect to the ground. Further, in the second position the movable splash guard portion 130 is approximately perpendicular with respect to the bottom 3 of the housing.

Figure 11:
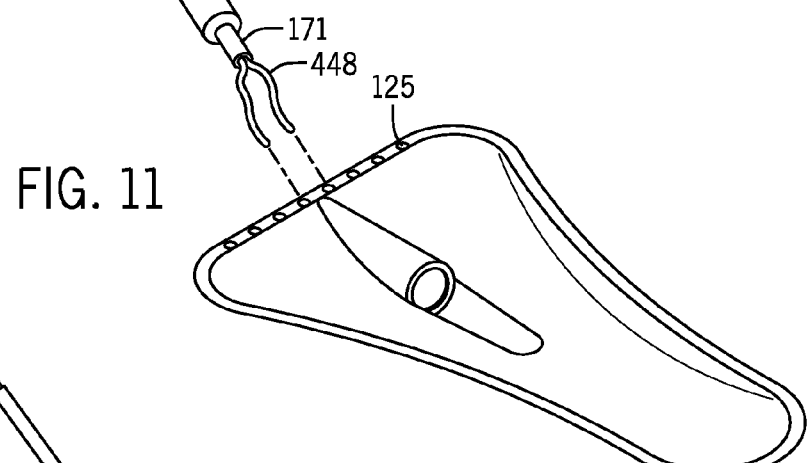
FIG. 11 illustrates an alternative embodiment of the removable handle wherein the removable handle is in the process of being temporarily secured to the main body of the device by a plurality of prongs.
Figure 12:
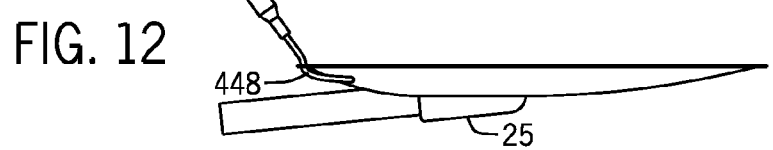
FIG. 12 illustrates the alternative embodiment of the removable handle portion wherein the removable handle portion is secured to the main body housing.

Finally, referring now to FIGS. 11 and 12, in an alternative embodiment to how the removable handle portion 95 is secured to the main body housing 1 of the device, the removable handle portion 95 may have a first and second prong 448 which are temporarily secured into some of the openings 125 of the main body housing 1. More specifically, the first and second prong 448 of the removable handle portion 95 may have a bend which may be slightly angled (see FIG. 12) and for which may be temporarily secured within two of the openings 125 of the back 5 of the main body housing 1 wherein the openings 125 not receiving the first and second prong 448 remain drainage openings. To secure the removable handle portion 95 to the main body housing 1, a user inserts the first and second prong 448 into two of the openings 125 and then tilts the removable handle portion 95 backward so that the bottom portion (the bent portion) of the prongs 448 support the weight of the main body housing 1. Further, the removable handle portion 95 may have a first end 171 and a second end 172 wherein the first end 171 of the removable handle portion 95 is temporarily secured to the main body housing 1. In an embodiment, the removable handle portion 95 may telescopically extend (FIGS. 11 and 12). In an embodiment, the first and second prongs 448 are bent at an angle of between one hundred and twenty and one hundred and sixty degrees (FIG. 12).

Although embodiments of the present invention are shown and described therein, it should be understood that various changes and modifications to the presently preferred embodiments will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A device for collecting the urine of an animal comprising:
   a housing having a top, a bottom, a front, a back, a first side, a second side and a generally hollow interior wherein the top of the housing is open and wherein the bottom of the housing is concave;
   a concave reservoir portion located within the bottom wherein urine from an animal flows into the bottom of the housing and then into the concave reservoir portion;
   a main opening within the concave reservoir portion wherein urine located within the concave reservoir portion flows through the opening;
   a removable vial located outside of the housing and temporarily secured to the opening of the concave reservoir portion wherein urine which exits the housing through the main opening travels to the removable vial; and
   a plurality of openings located in the concave reservoir portion which allows urine to drain out of the concave reservoir portion in a location other than the main opening wherein the plurality of openings are smaller than the main opening.

2. The device for collecting the urine of an animal of claim 1 further comprising:
   an extended generally rectangular ridge located on the back of the housing wherein the extended generally rectangular ridge receives a groove of a removable handle unit and wherein the removable handle unit is secured to the housing by friction.

3. A device for collecting the urine of an animal comprising:
   a housing having a top, a bottom, a front, a back, a first side, a second side and a generally hollow interior wherein the top of the housing is open and wherein the bottom of the housing is concave;
   a concave reservoir portion located within the bottom wherein urine from an animal flows into the bottom of the housing and then into the concave reservoir portion;
   a main opening within the concave reservoir portion wherein urine located within the concave reservoir portion flows through the opening;
   a removable vial located outside of the housing and temporarily secured to the opening of the concave reservoir portion wherein urine which exits the housing through the main opening travels to the removable vial; and
   an extended generally rectangular splash guard which extends from the first side or the second side of the housing wherein the extended generally rectangular splash guard moves from a first position to a second position wherein in the second position the extended generally rectangular splash guard is generally perpendicular with respect to the bottom of the housing.

4. A device for collecting the urine of an animal comprising:
   a housing having a top, a bottom, a front, a back, a first side, a second side and a generally hollow interior wherein the top of the housing is open and wherein the bottom of the housing is concave;
   a concave reservoir portion located within the bottom wherein urine from an animal flows into the bottom of the housing and then into the concave reservoir portion;
   a main opening within the concave reservoir portion wherein urine located within the concave reservoir portion flows through the opening;
   a removable vial located outside of the housing and temporarily secured to the opening of the concave reservoir portion wherein urine which exits the housing through the main opening travels to the removable vial; and
   a plurality of openings at the back of the housing wherein the plurality of openings receive a plurality of prongs of a removable handle unit and wherein a portion of the plurality of prongs of the removable handle unit support the bottom of the housing when the removable handle unit is secured to the housing.

5. The device for collecting urine of an animal of claim 4 further comprising:
   a bend in the plurality of prongs of the removable handle unit.

6. The device for collecting urine of an animal of claim 5 wherein the bend is between one hundred and twenty degrees and one hundred and sixty degrees.

* * * * *